(12) United States Patent
Burkett et al.

(10) Patent No.: US 6,671,853 B1
(45) Date of Patent: Dec. 30, 2003

(54) METHOD AND SYSTEM FOR SELECTIVELY STREAMING MARKUP LANGUAGE DOCUMENTS

(75) Inventors: Charles Edward Burkett, Chapel Hill, NC (US); David Bruce Lection, Raleigh, NC (US); Elizabeth Schreiber, Apex, NC (US); David B. Styles, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,878

(22) Filed: Jul. 15, 1999

(51) Int. Cl.[7] .............................................. G06F 15/00
(52) U.S. Cl. ...................... 715/513; 715/501.1; 715/514
(58) Field of Search ............................... 707/500.1, 513, 707/514; 715/520.1, 513, 514

(56) References Cited

U.S. PATENT DOCUMENTS

| | | | | |
|---|---|---|---|---|
| 5,416,896 A | * | 5/1995 | Motoyama | 707/514 |
| 5,696,918 A | * | 12/1997 | Barker et al. | 345/803 |
| 5,727,220 A | * | 3/1998 | Hohensee et al. | 345/764 |
| 5,842,217 A | * | 11/1998 | Light | 707/101 |
| 6,199,081 B1 | * | 3/2001 | Meyerzon et al. | 707/513 |
| 6,356,920 B1 | * | 3/2002 | Vandersluis | 707/501.1 |
| 6,418,446 B1 | * | 7/2002 | Lection et al. | 709/203 |

\* cited by examiner

*Primary Examiner*—Joseph H. Feild
*Assistant Examiner*—Maikhanh Nguyen
(74) *Attorney, Agent, or Firm*—Jeanine S. Ray-Yarletts; Marcia L. Doubet

(57) ABSTRACT

A method, system, and computer-readable code for a technique with which documents encoded according to the Extensible Markup Language (XML) notation or a derivative thereof can be more efficiently processed by selectively streaming document fragments. This selective streaming technique comprises identifying the static and the changeable portions or fragments of a document. The static fragments are written to a serialized binary format (i.e. a serialized binary stream), such as a disk file, thereby avoiding the re-parsing of this information when reconstituting a Document Object Model (DOM) tree for the document. Volatile fragments, on the other hand, remain in the XML or derivative notation when written to an output file.

24 Claims, 13 Drawing Sheets

A Flexi-Stream Tree

A Flexi-Stream Tree After Streaming - Root Stream S

FIG. 4B

464 `<PIT STREAM-AS-XML="TRUE">`
474 `<SEED STREAM-AS-XML="TRUE" />`
465 `</PIT>`

444 `<APPLE STREAM-AS-XML="TRUE"/>`

XS2

A Flexi-Stream Tree After Streaming - Sub Streams XS1 & XS2 as XML DOCUMENTS

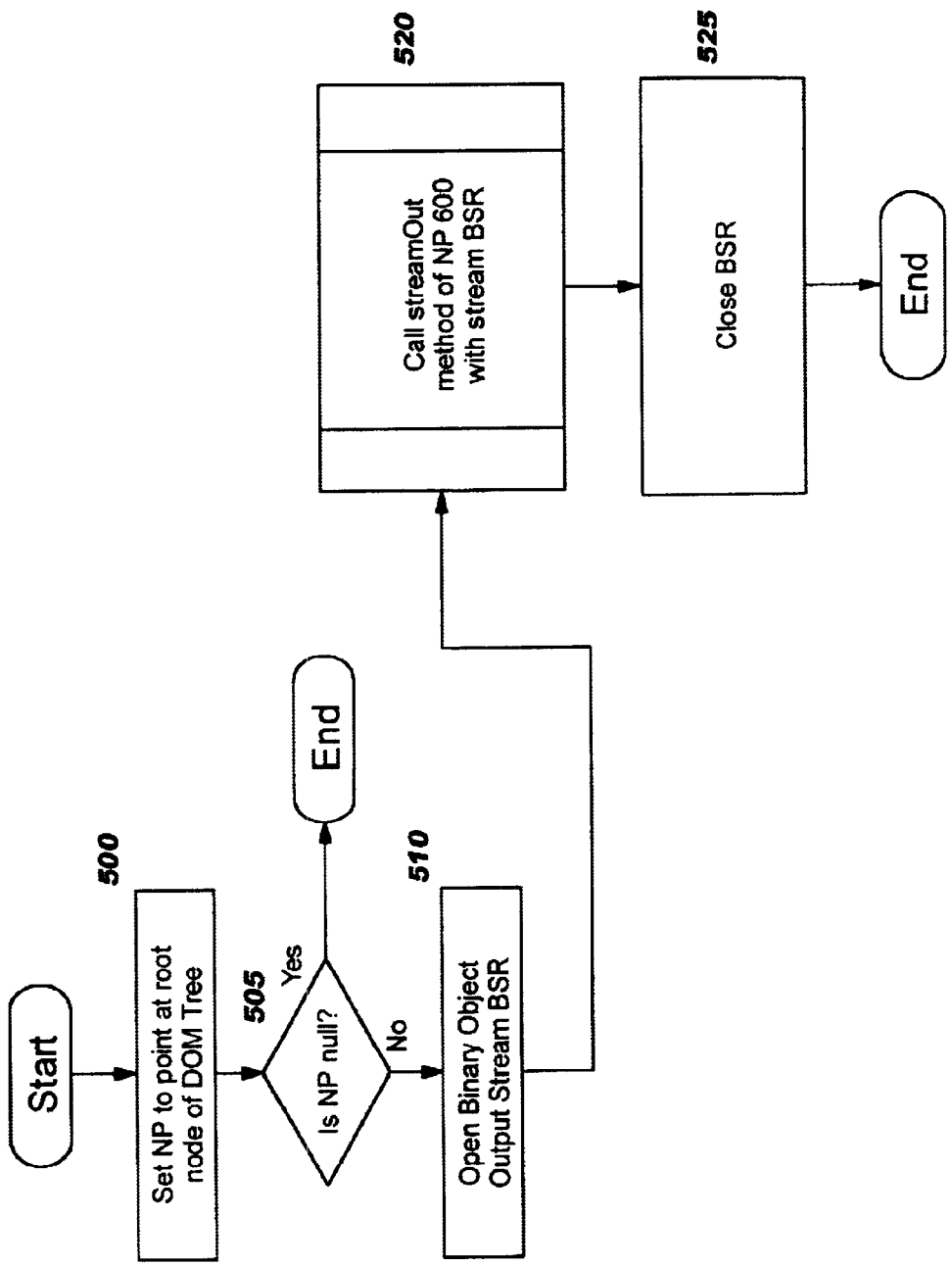

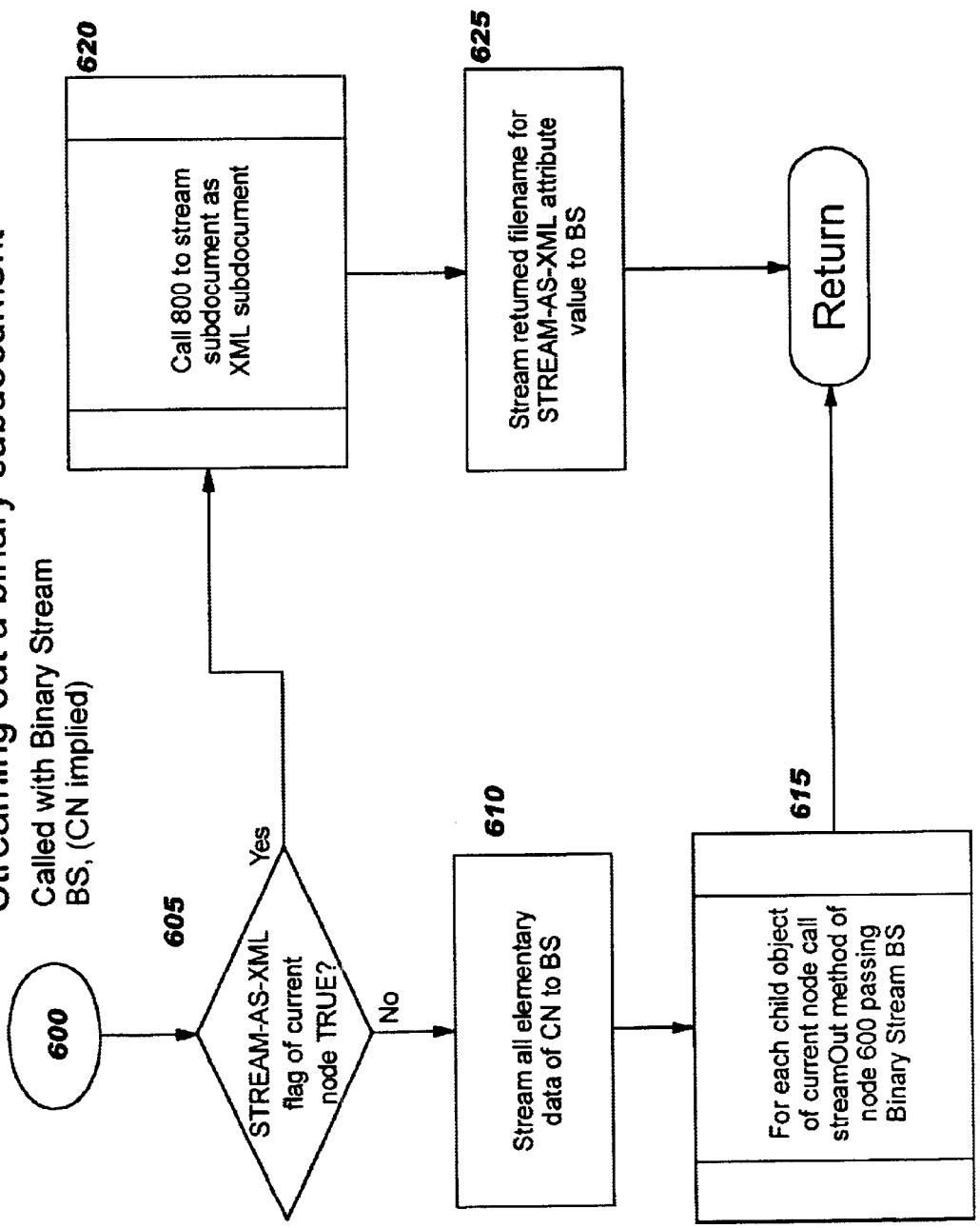

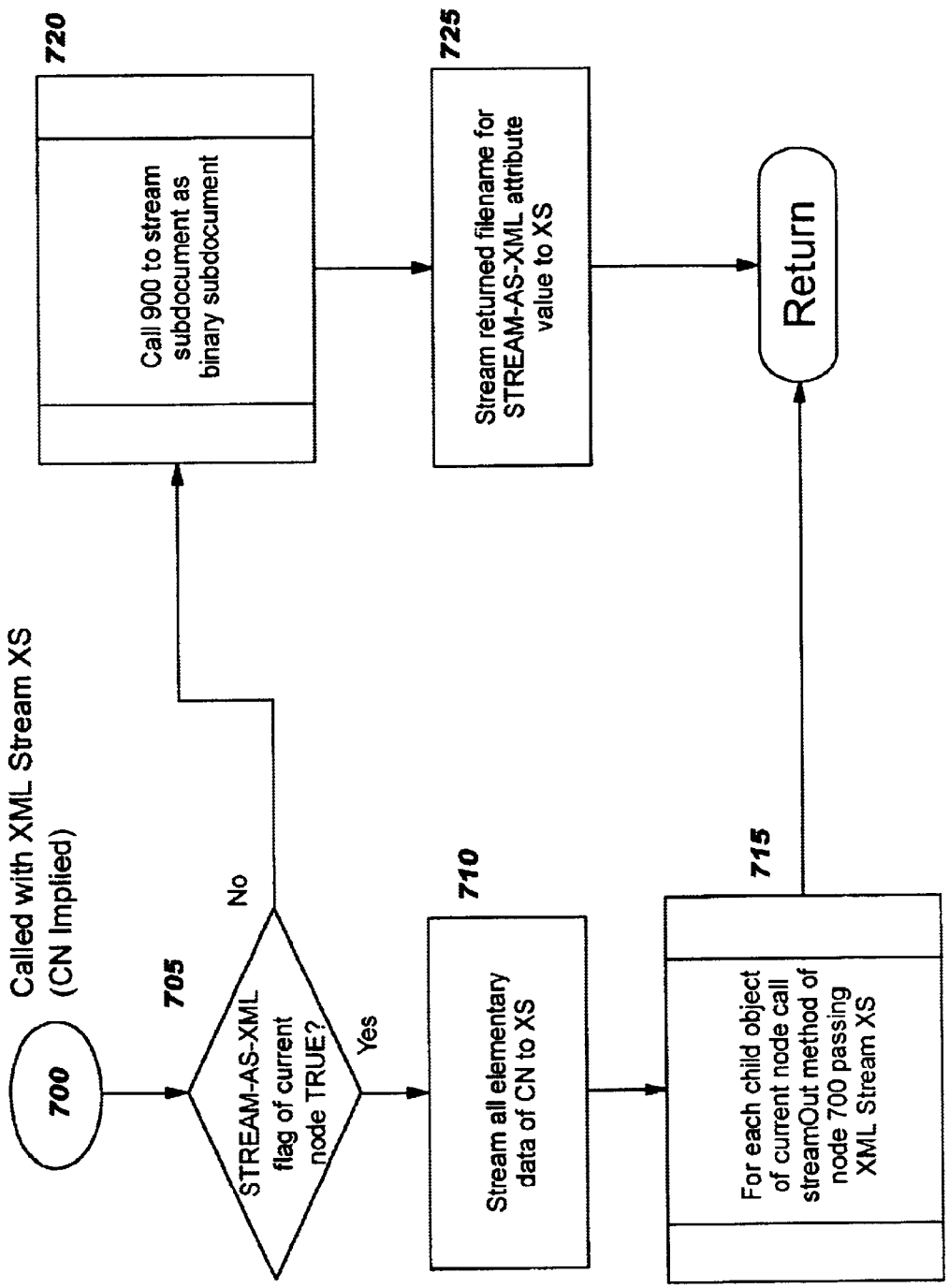

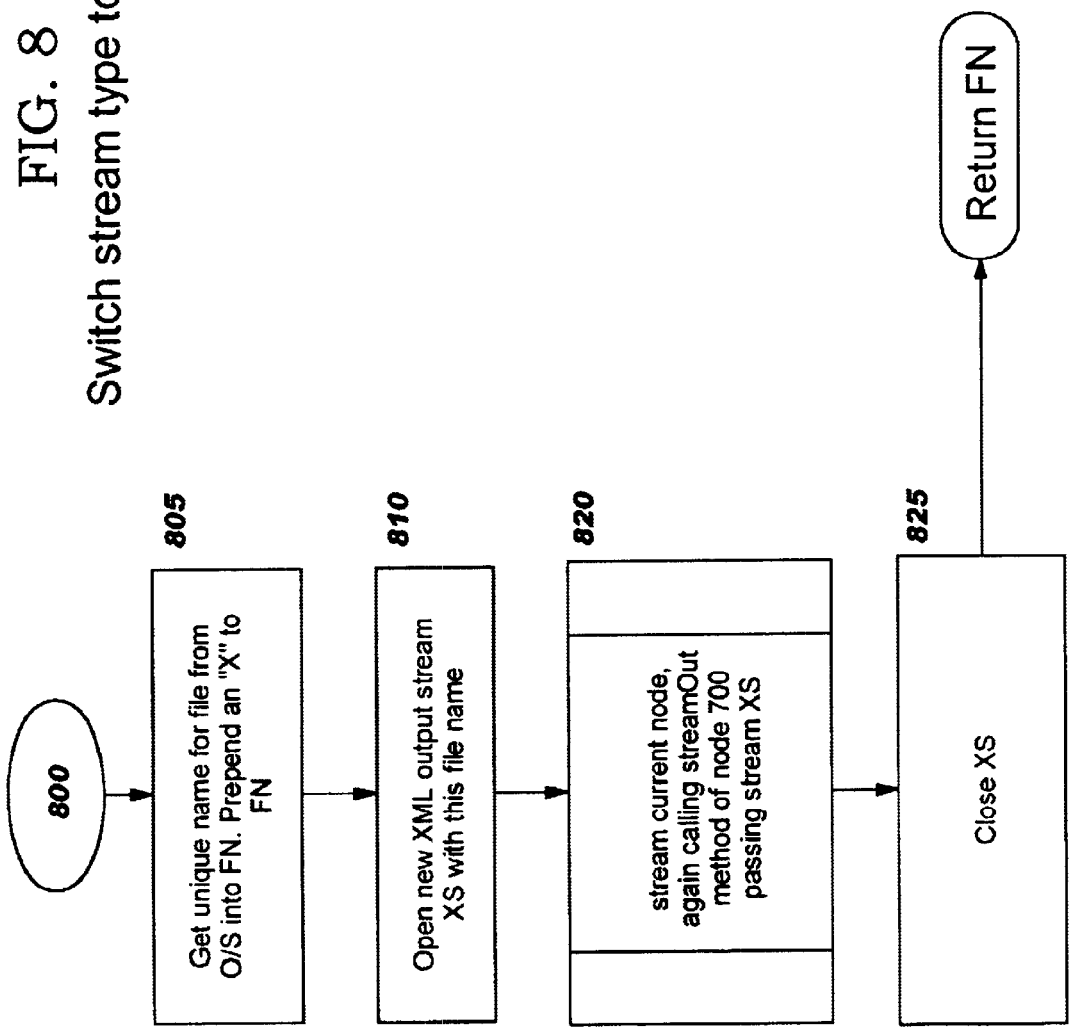

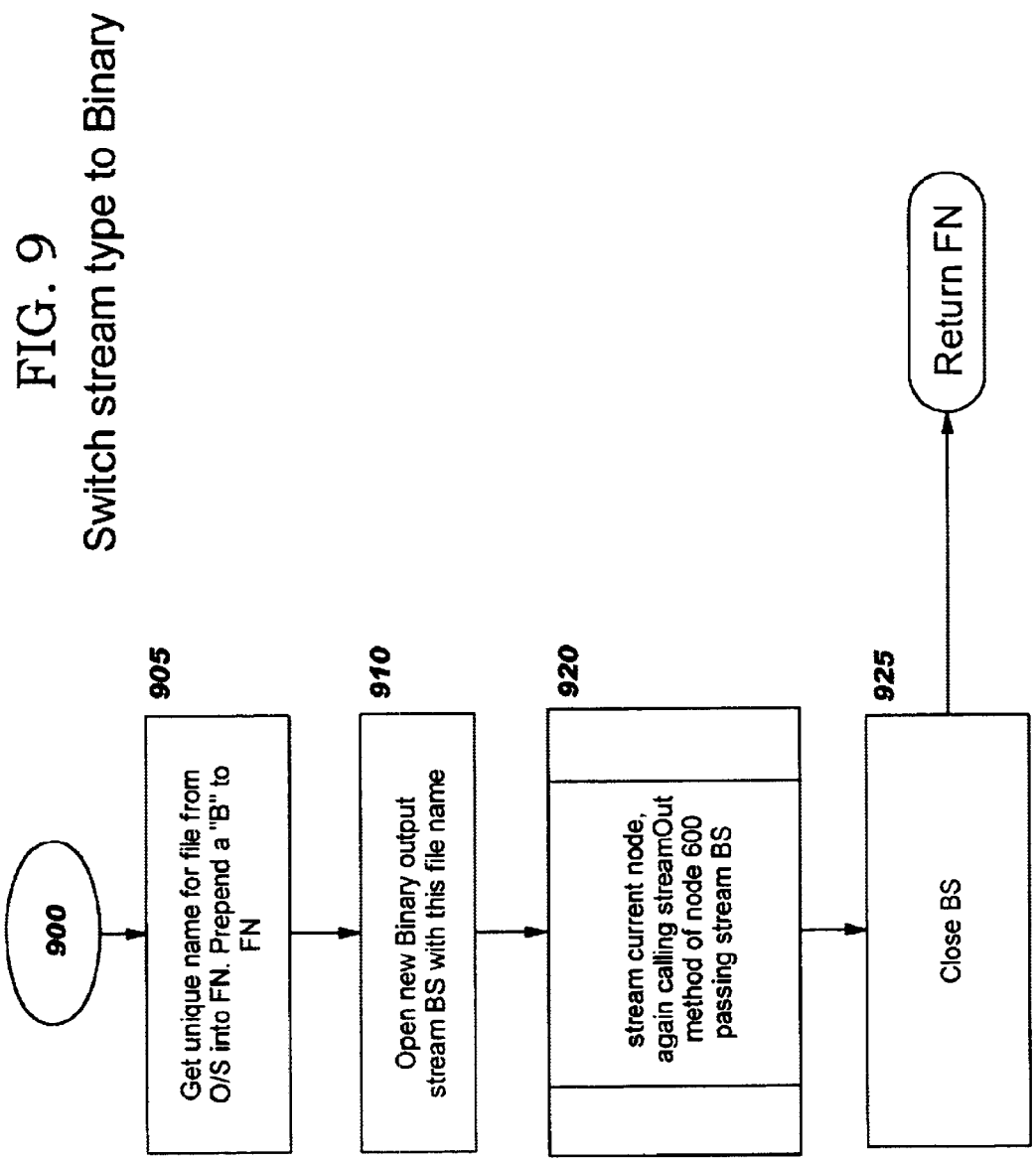

Recreating a DOM from a Flexi-Stream Document

Streaming the DOM From a Binary Stream

Streaming by parsing to the DOM from an XML document

METHOD AND SYSTEM FOR SELECTIVELY STREAMING MARKUP LANGUAGE DOCUMENTS

BACKGROUND OF THE INVENTION

1. Field of the Invention

The present invention relates to a computer system, and deals more particularly with a method, system, and computer-readable code for selectively streaming documents, where the document is preferably encoded in the Extensible Markup Language or a derivative thereof. The selective streaming technique comprises identifying the static and the changeable portions of a document, and writing the static portions in a serialized binary output format while writing the changeable portions in a tagged, parseable format.

2. Description of the Related Art

The term "document" is often used in reference to a class of data objects in the Internet and World Wide Web (hereinafter, "Web") environments. In this context, a document comprises information content stored in one or more files. A document may be displayed on a computer display screen for viewing by a user, printed, transferred between computers, processed by computer software programs, and so forth. These concepts are well known in the art.

An "XML document" is a document created according to the requirements of the Extensible Markup Language, or XML, specification. XML is a standardized formatting notation, created for structured document interchange on the Web. Refer to "Extensible Markup Language (XML), W3C Recommendation Feb. 10, 1998" which is available on the Web at http://www.w3.org/TR/1998/REC-xml-19980210, for more information on XML.

XML is a tag language, where specially-designated constructs referred to as "tags" are used to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. In XML and its derivative notations, a tag is inserted preceding its associated data: a corresponding tag is also inserted following the data, to clearly identify where that data ends. As an example of using tags, the syntax "<email>" could be used as a tag to indicate that the character string appearing in the data stream after this tag is to treated as an e-mail address; the syntax "</email>" would then be inserted after the character string, to delimit where the e-mail character string ends.

XML is widely accepted in the computer industry for defining the semantics (that is, by specifying meaningful tags) and content of the data encoded in a file. The extensible, user-defined tags enable the user to easily define a data model, which may change from one file to another. When an application generates the tags (and corresponding data) for a file according to a particular data model and transmits that file to another application that also understands this data model, the XML notation functions as a conduit, enabling a smooth transfer of information from one application to the other. By parsing the tags of the data model from the received file, the receiving application can re-create the information for display, printing, or other processing, as the generating application intended it.

A number of markup languages have been defined, and continue to be defined, which are based upon XML. Examples include the Wireless Markup Language ("WML"), and Math Markup Language ("MathML"). XML is an ideal language upon which to base new languages, because as the name implies, it was defined to be extensible. That is, the syntax of XML provides users the capability to define their own tags, in accordance with the data and semantics of a particular application. Hereinafter, the phrase "XML derivative" will be used to refer to languages derived from XML (including derivation of a language from another XML derivative).

When a parser for XML or an XML derivative processes an input file, it reads the file and constructs a "DOM tree" based on the syntax of the tags embedded in the file and the interrelationships between those tags. The tag syntax is stored in the nodes of the DOM tree, and the shape of the tree is determined from the tag relationships. "DOM" is an acronym for "Document Object Model", which is a language-independent application programming interface ("API") for use with documents specified in markup languages including XML. DOM is published as a Recommendation of the World Wide Web Consortium, titled "Document Object Model (DOM) Level 1 Specification, Version 1.0" (1998) and available on the World Wide Web at http://www.w3.org/TR/REC-DOM-Level-1.

"DOM tree" refers to the logical structure with which a document is modeled using the DOM. A DOM tree is a hierarchical representation of the document structure and contents. Each DOM tree has a root node and one or more leaf nodes, with zero or more intermediate nodes, using the terminology for tree structures that is commonly known in the computer programming art. A node's predecessor node in the tree is called a "parent" and nodes below a given node in the tree are called "child" nodes.

The DOM API enables application programs to access this tree-oriented abstraction of a document, and to manipulate document structure and contents (that is, by changing, deleting, and/or adding elements). Further, the DOM enables navigating the structure of the document.

The flexibility of XML enables it to be used to represent complex information. Using the DOM APIs, XML can be used not just with information that is static in nature, but also with information that changes dynamically. With changing information, a DOM tree is created that represents an initial state of the information; this DOM tree may then be altered to reflect the dynamic changes. If new content is required, new nodes are added to the DOM tree to reflect the changed state of the content. The corresponding nodes are removed from the DOM tree if content is to be deleted. And the nodes of the DOM tree are changed when content is to be modified.

When an XML document is small, the parsing time to create the corresponding DOM tree using today's genre of parsers is relatively fast. When the size and complexity of an XML document is larger, however, the document parsing takes longer. A given XML document may grow in size and complexity over time, as new tags and new tag values are added, causing the parsing time to increase even further. Typically, a human user is awaiting the results of the parsing process—for example, waiting for a document to be formatted and displayed in a Web browser or similar application. As parsing time increases, application performance is adversely affected.

To avoid this performance degradation and the frustration it causes for users, it would be desirable to preprocess (that is, pre-parse) documents. If a document is static in nature, the document can be parsed into a DOM tree, and this DOM tree can then be streamed into binary format using Java or C++ object streaming. ("Java" is a trademark of Sun Microsystems, Inc.) Techniques for binary streaming of complex hierarchical objects, such as the tree structure used for a DOM, are well known in the art and the methods (i.e. software) with which these techniques are implemented are readily available. The streamed objects resulting from this process are also referred to as "serialized" objects. Typically, the serialization process for an object occurs by invoking a predefined serialize method on the object, passing the name of an output stream as a parameter to this method. The method then writes the object to that stream in a serial form. Any embedded or referenced objects are processed recursively during this process. Upon completion of this process, the stream is closed and written out to an alternate medium such as a file on disk or a communications channel. The stream represents a "flattened" version of the object. This flattened output contains information about the original structure of the object, so that the structured object can be recreated by applying a "de-serialization" method, passing the flattened output as an input parameter. Typically, the de-serialization method is completely symmetric to the serialization method.

This serialization process can be applied to tree structured objects, such as DOM trees. The serialization begins with the root node of the tree, and recursively descends through the lower-level tree nodes. The serialized or streamed DOM can then be written to a file. When the document is subsequently re-accessed (for example, by requesting re-display or reloading of the document in a Web browser), the DOM can be reconstituted (that is, "de-serialized") directly from the binary stream without reparsing—and without the performance impact of the parsing process that would be required to access the document from its tagged XML form.

It is also known in the art that an XML-based stream can be passed to a DOM tree, and the DOM tree c then be streamed out in XML format. This process yields an XML tagged document, representing the DOM. This tagged document can then be easily modified, using existing techniques. The process to get the document back into the DOM, however, is not symmetric: a parser must be used, parsing the tag syntax in order to (re)create the DOM. For larger documents, this can be relatively time-consuming, as the parsing process performs syntax checking and other operations while generating a DOM tree. Thus, it will almost always be faster to stream a DOM in from a binary representation than it will be to create the DOM from a tagged XML document (except, perhaps, where the tagged document may be quite small).

If a document is volatile in nature, however, this binary streaming technique is less likely to improve performance. This is because the binary streamed form of the information is not easily modifiable. Typically, if the information represented by the binary stream needs to be modified, it must first be de-serialized so that the DOM tree is reconstituted. The DOM tree can then be operated upon, and the result streamed back into binary form. So, for maximum performance, it is preferable to stream a DOM to a binary stream. But to enable easily modifying a document, it is preferable to leave it in tagged form. These two techniques are not integrated in the current art, forcing a choice to be made between ease of modification and speed.

Typically, a given document will include both static information and changeable information. The ability to store static portions of the information in serialized, binary format while storing changeable information with its tags in a tagged document format would enable the advantages of each approach to be realized. This ability does not, however, exist in the current art. Accordingly, a need exists for a technique with which documents encoded according to the XML notation or a derivative thereof can be more efficiently processed. This technique should overcome known performance problems that result when parsing large documents, without introducing new performance inefficiencies.

SUMMARY OF THE INVENTION

An object of the present invention is to provide a technique whereby documents encoded according to the XML notation or a derivative thereof can be more efficiently processed.

Another object of the present invention is to provide this technique by selectively streaming document fragments.

Still another object of the present invention is to provide this technique whereby static document fragments are pre-parsed and streamed as serialized binary data, while volatile fragments are not.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, a system, and a method for use in a computing environment, for selectively streaming documents. In a first aspect, this technique comprises: processing each of a plurality of nodes of an input Document Object Model (DOM) tree representing a document to be selectively streamed, wherein each of the nodes has either a static indicator or a dynamic indicator associated therewith; streaming each of the processed nodes which has the static indicator to a serialized binary output stream; and streaming each of the processed nodes which has the dynamic indicator to one or more non-binary output files. This technique may further comprise: processing a transition from binary mode to tag mode upon detecting a change from processing nodes having the static indicator to processing nodes having the dynamic indicator; and processing a transition from tag mode to binary mode upon detecting a subsequent mode change wherein the processed nodes had the dynamic indicator but now have the static indicator. Processing the transition from binary mode preferably further comprises: writing a transition node indicator into the serialized binary output stream; opening a new one of the non-binary output files; and writing to the opened new file until detecting the subsequent mode change. Processing the transition from tag mode preferably further comprises: writing a transition node indicator into the opened new file; and writing to the opened new stream until detecting the change to tag mode.

In a second aspect, this technique modifies the first aspect by streaming each of the processed nodes which has the static indicator to one or more serialized binary output streams. This second aspect may further comprise: processing a transition from binary mode to tag mode upon detecting a change from processing nodes having the static indicator to processing nodes having the dynamic indicator; and processing a transition from tag mode to binary mode upon detecting a subsequent mode change wherein the processed nodes had the dynamic indicator but now have the static indicator. Processing the transition from binary mode preferably further comprises: writing a transition node indicator into the serialized binary output stream; opening a new one of the non-binary output files; and writing to the opened new file until detecting the subsequent mode change. Processing the transition from tag mode preferably further comprises: writing a transition node indicator into the opened new file; opening a new one of the serialized binary output streams; and writing to the opened new stream until detecting the change to tag mode.

In either aspect, the non-binary output files may comprise information encoded in a tag language. The tag language may be Extensible Markup Language (XML), or a derivative thereof.

In the first aspect, the technique may further comprise reconstituting the DOM tree from the serialized binary output stream and the one or more non-binary output files. In the second aspect, the technique may further comprise reconstituting the DOM tree from the one or more serialized binary output streams and the one or more non-binary output files.

The present invention will now be described with reference to the following drawings, in which like reference numbers denote the same element throughout.

BRIEF DESCRIPTION OF THE DRAWINGS

FIGS. 4A–4C illustrate the contents of the files, from a conceptual perspective, resulting from use of the present invention to selectively stream the example tree of FIG. 3;

FIGS. 5–9 illustrate flow charts which set forth the logic which may be used to implement a preferred embodiment of the selective streaming technique of the present invention.

DESCRIPTION OF THE PREFERRED EMBODIMENT

Figure 1:
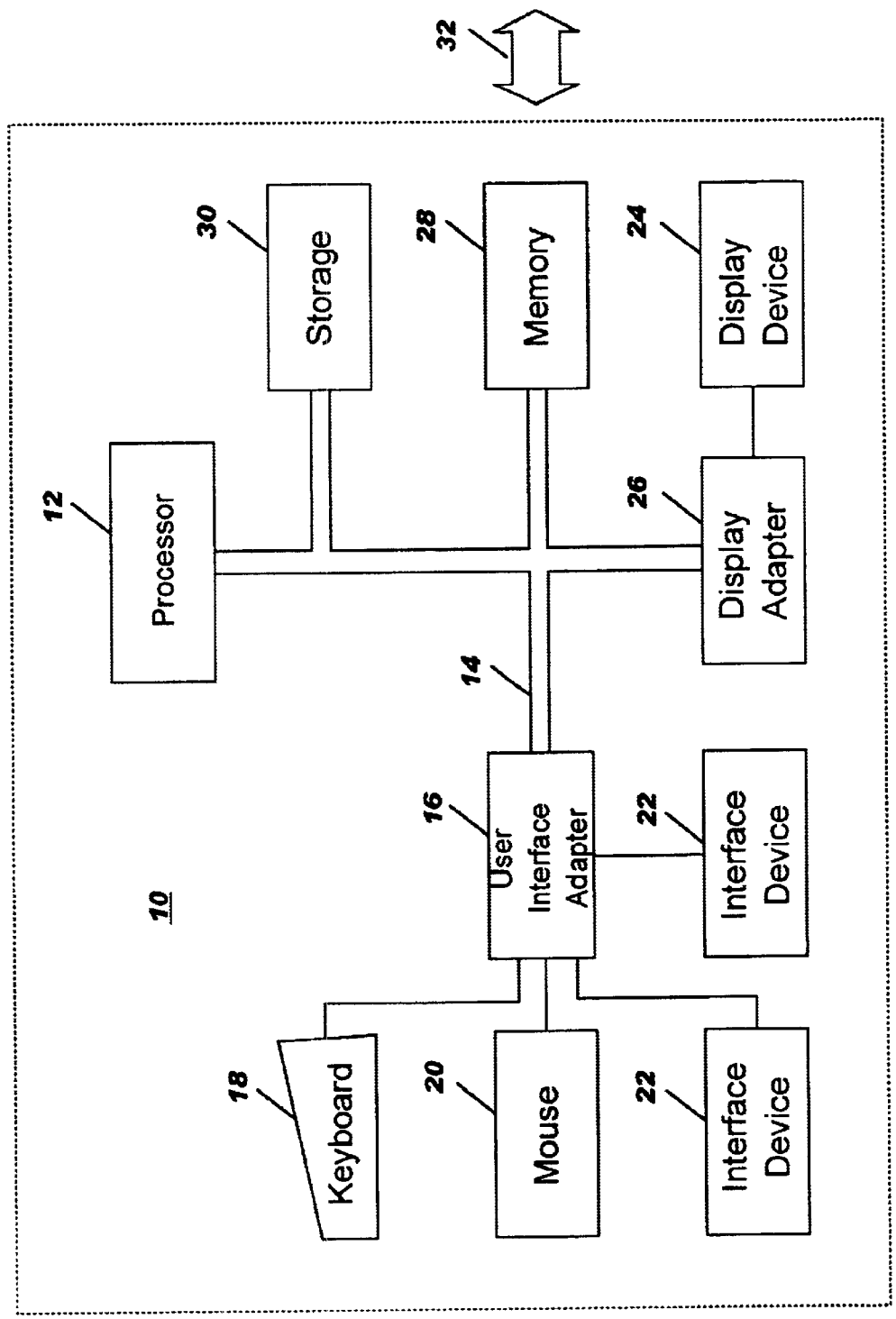
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
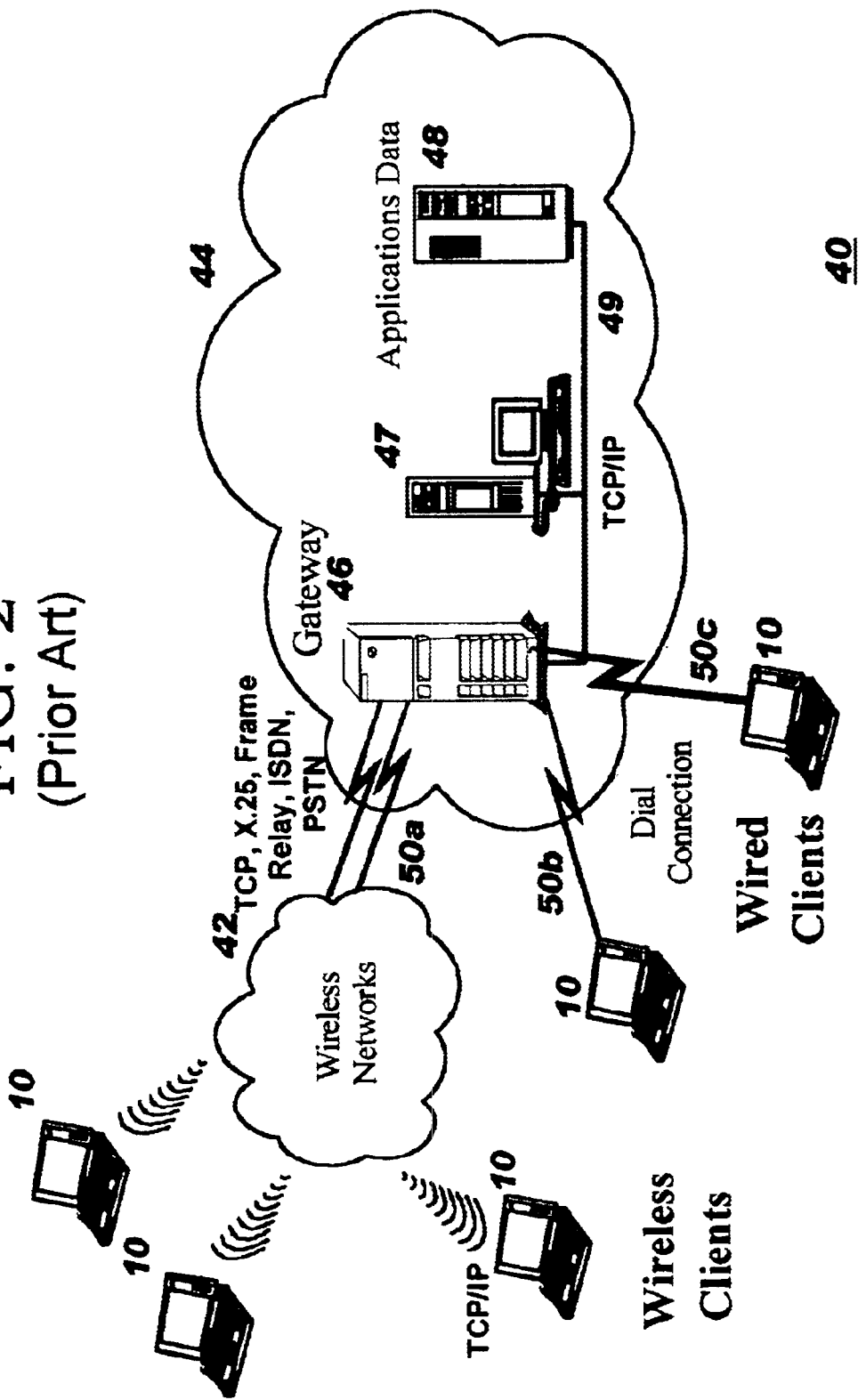
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

When the present invention is used in a client-server networking environment, a client computer on which the present invention operates may be connected to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, a client computer will be referred to equivalently as a "workstation", "device", or "computer", and use of any of these terms or the term "server" refers to any of the types of computing devices described above.

In the preferred embodiment, the present invention is implemented as one or more computer software programs. The implementation of the software that selectively streams XML or XML derivative files may operate on a server in a network, as one or more modules (also referred to as code subroutines, or "objects" in object-oriented programming) which are invoked upon request. Alternatively, the selective streaming software may operate on a user's workstation. The program code of the preferred embodiment is preferably implemented as objects in an object-oriented programming language, such as the C++ or Java programming language. The logic implementing the selective streaming may be integrated with the code of a program which operates upon the XML or XML derivative files (such as a browser or application program), or it may be implemented as one or more separate utility modules which are invoked by such a program, without deviating from the inventive concepts disclosed herein. Similarly, the reverse process of recreating a DOM from streamed data (hereinafter referred to as "unstreaming") may operate on a server, or on a user's workstation, and this software may be provided in one or more separate utility modules that are invoked to recreate the file content before using it in an application, or it may be integrated into an application that processes the files. The logic for performing the streaming and unstreaming processes may be implemented in a single program, or in different programs, without deviating from the scope of the present invention.

The present invention may be used in an Internet environment. Alternatively, the environment may be a corporate intranet, an extranet, or any other network environment. Or, the present invention may be used in a stand-alone environment, where files are streamed to or unstreamed from a storage medium directly accessible from a workstation (such as a desktop computer), a server, or other type of computer. Streamed files may be exchanged between computers (such as from a server to a requesting client in a client-server network environment) over a network connection, or the file content may also be transferred between computers via a storage media (such as diskette), or the file content may be used locally within a single computer, without deviating from the inventive concepts disclosed herein.

Note that the word "file" is used throughout this disclosure to refer to stored data. This is for ease of reference only, and is not meant to imply any particular structure for storing the data. The data with which the present invention may be beneficially used may be stored in any number of ways without deviating from the inventive concepts disclosed herein, such as: a data element in a database, an object attribute in a directory entry, an object in flash memory, etc.

The present invention provides an advantageous technique for selectively streaming static portions of XML documents in a serialized binary mode, enabling the information represented therein to be very quickly reconstituted upon a subsequent access, while streaming the changeable portions along with their XML tag syntax, enabling this information to be readily modifiable without requiring the serialized binary stream(s) to be processed or loaded during the modification process. An example of the type of information with which this technique will be beneficial is the scenario of students enrolled in college courses, where the relevant information pertaining to each student includes their personal information and their course information. The personal information includes the student's name, social security number, home address, etc. This information is typically static in nature, and thus could be the portion streamed in serialized binary mode by the present invention. The information about what courses the student is currently taking, which teachers are currently teaching this student, what grades have been earned, etc. during a particular semester is changeable. This part of the student's information could be streamed in XML mode by the present invention, enabling it to be easily changed. Many other examples of applying the present invention can be imagined, including those where the changeable data changes very frequently. For example, credit card information could be represented in this manner, where the customer name and billing address is relatively static whereas the balance due and available credit information changes quite often (and thus needs to be efficiently modifiable).

The preferred embodiment of the present invention will now be discussed in more detail with reference to FIGS. 3 through 12.

Figure 3:
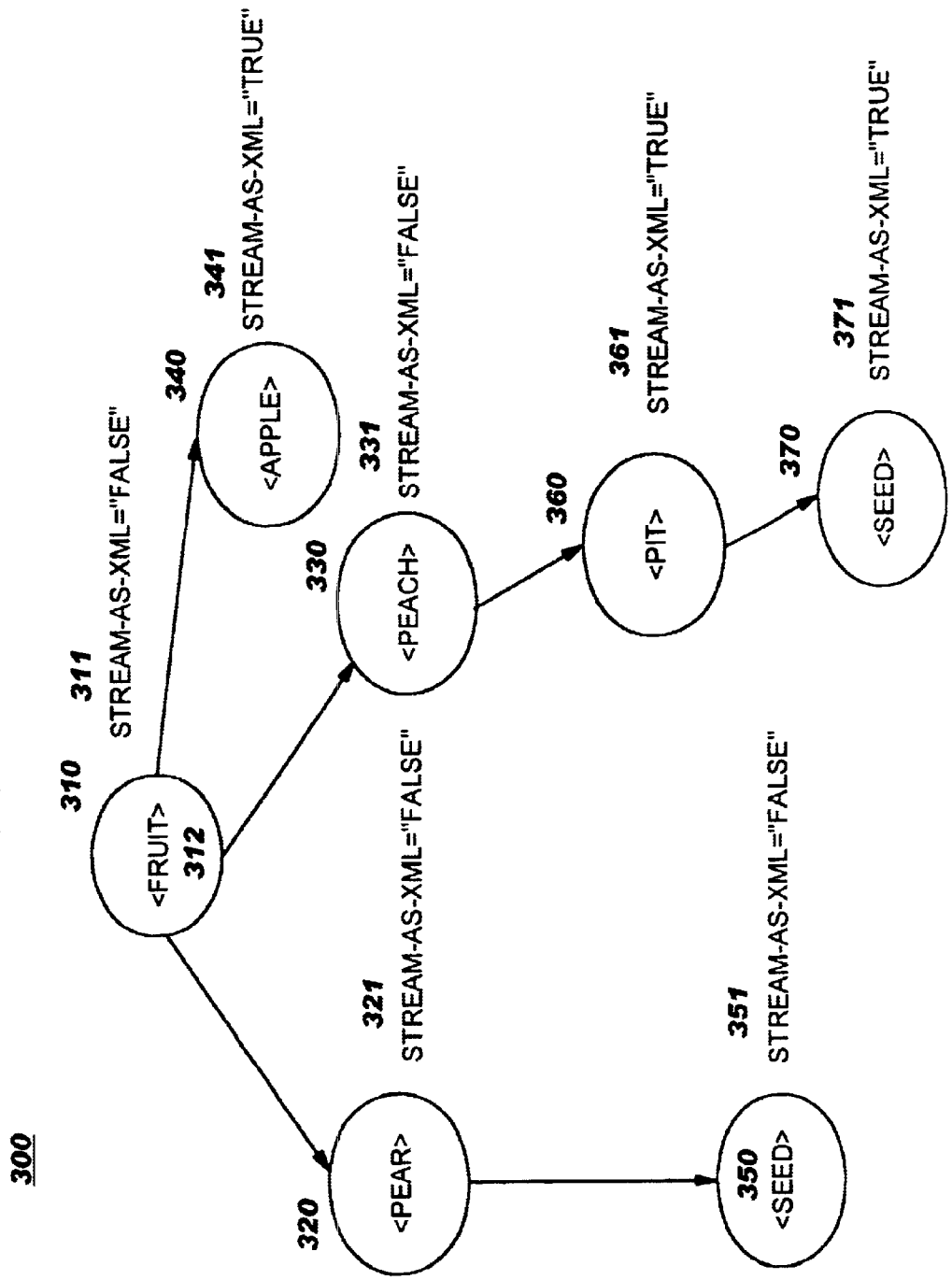
FIG. 3 is an example of a tree upon which the present invention may operate.

FIG. 3 depicts a simple tree structure 300, representing a DOM tree for a parsed XML or XML derivative document, upon which the selective streaming technique of the present invention may operate. (For ease of reference, use of the term "XML" hereinafter is to be considered as also referring to XML derivative notations, unless otherwise indicated.) The tree 300 has a root node 310; a first subtree comprising nodes 320 and its child node 350; a second subtree comprising nodes 330, 360, and 370, and a third subtree comprising the single node 340. Each node in the example is depicted with its corresponding tag, such as "<FRUIT>" 312 for node 310. Each node is also shown with an attribute, indicated by reference numerals 311, 321, 331, . . . 371. Attributes are well known in the art. The particular attribute syntax which is defined for the present invention uses, in the preferred embodiment, the string "STREAM-AS-XML". This attribute may have the Boolean values TRUE or FALSE (or an equivalent representation thereof, such as "1" for TRUE and "0" for FALSE), or it may be a file name. When the value is a file name, this value specifies an output location where the information for the node has been written during the selective streaming process. The example tree in FIG. 3 uses only the values TRUE and FALSE, as this tree has not yet been selectively streamed by the present invention.

Figure 4A:
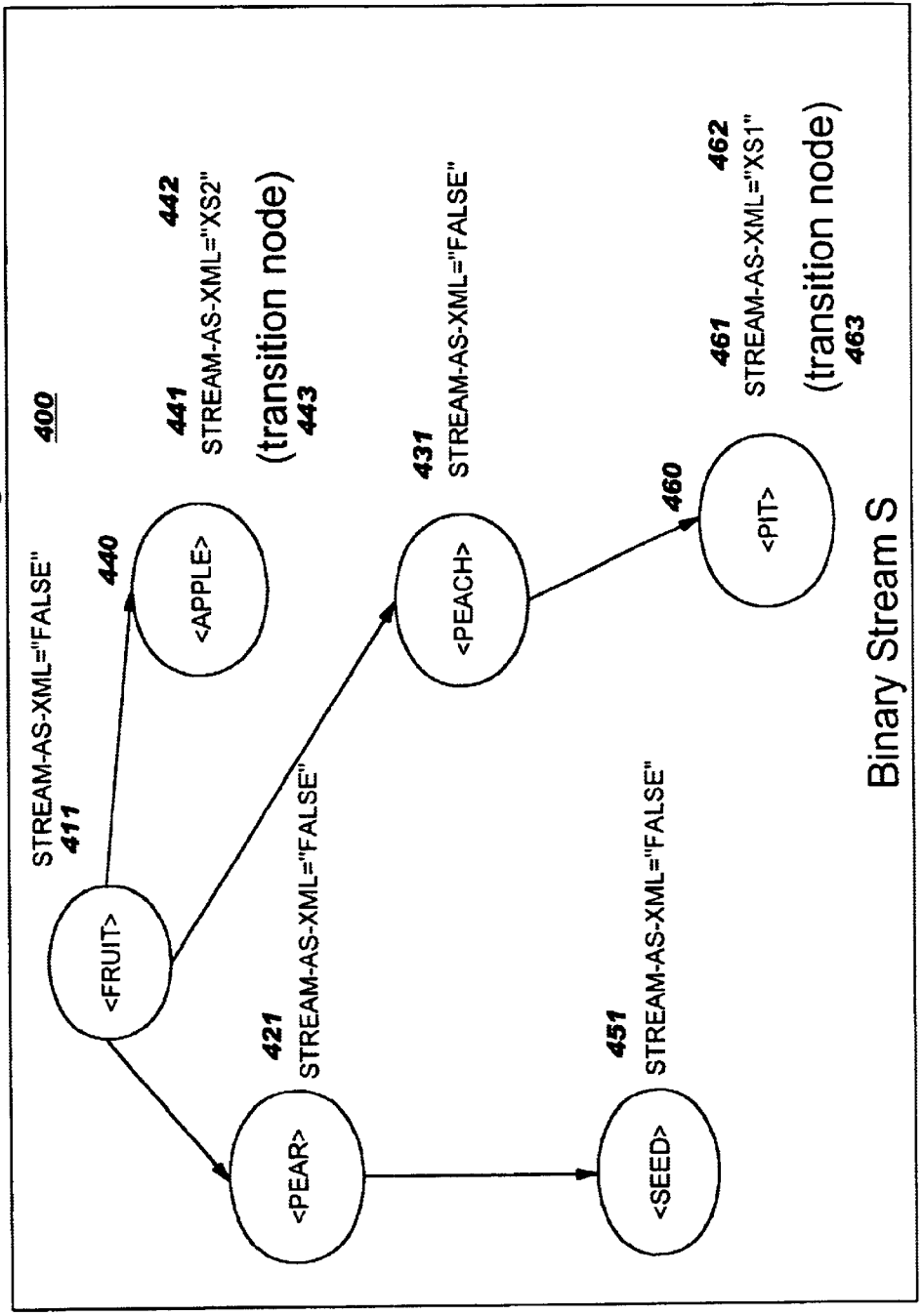

FIGS. 4A–4C depict, from a conceptual perspective, the contents of the files resulting from use of the present invention to selectively stream the example tree of FIG. 3. FIG. 4A represents a serialized binary stream "S", where the information corresponding to (at least a portion of) the nodes streamed as flattened binary information is now stored. These are the nodes for which the STREAM-AS-XML attribute was set to FALSE in the input tree (in this example, nodes 310, 320, 330, and 350 of input tree 300). For those nodes of the input tree where the STREAM-AS-XML attribute was set to TRUE (nodes 340, 360, and 370 in the example), the node information is not stored in the serialized binary stream S. Instead, the information for these nodes has been written to one or more separate files, retaining the XML tag notation to make modification of the information easier. (Note: The preferred embodiment discusses creation of multiple serial binary output streams, even though a single binary file S has been shown in FIG. 4A as representing the serialized binary information for input tree 300. If a node under node 360, 370, or 340 of FIG. 3 had a node with STREAM-AS-XML=FALSE, the preferred embodiment would create a second serial binary output stream, and this would be reflected as a transition node in one of the XML files depicted in FIGS. 4B and 4C. In a first alternative embodiment, a single file may be used for all serially-streamed information without deviating from the inventive concepts disclosed herein. It will be obvious to one of skill in the art how the logic described in detail below, with reference to FIGS. 5–9, may be modified to implement this alternative. For example, the processing of FIG. 9 begins by creating a new serialized binary output file. For this first alternative embodiment, this may be changed to use the single serial binary stream, referred to as "S", into which the streaming process begins.)

FIGS. 4B and 4C are two simple representations of the separate files created for XML data. The information for nodes 360 and 370 has been written to the file depicted as "XS1" in FIG. 4B. FIG. 4C represents the file "XS2", where information for node 340 has been written. The existence of these separate files is reflected in the tree structure 400 of FIG. 4A with the attribute values at 461 and 441. Because these attributes 441, 461 do not have a Boolean value, the value is necessarily a file name, as previously discussed. The file name "XS1" appears at 462, indicating that the information for node 460 was streamed to this file using XML notation. As this is a point in the tree where a change occurs between streaming data in binary and streaming data as XML (that is, where the value of the special attribute changed between FALSE and TRUE during traversal of the DOM tree), it is referred to herein as a "transition node" as indicated at 463. Node 440 is another transition node, where the information for this node was streamed to the file "XS2" (see 442). Note that the node "<SEED>" 370, which was a child of the node "<PIT>" 360 in FIG. 3, does not appear as a child of corresponding node "<PIT>" 460 in FIG. 4A. This is because no transition between streaming modes occurred when navigating (and processing) the input tree 300 from node 360 to 370. Accordingly, the information for both nodes 360 and 370 was streamed as XML to the same file "XS1". This is shown in FIG. 4B, where elements 464 and 465 represent node 360 and element 474 represents node 370. (As will be obvious to one of skill in the art, the files depicted in FIGS. 4B and 4C will contain all the information pertaining to the XML-streamed nodes from the original input tree. In the example, only the single attribute/value pair used by the present invention has been shown for each node, for purposes of illustrating the selective streaming technique.)

Using the unstreaming technique of the present invention, the information represented by FIGS. 4A–4C may be efficiently reconstructed into a single DOM tree. This reconstruction process automatically reflects modifications which may have been made to the potentially changeable information which has been separately stored with its XML tags. For example, suppose a user wished to remove "SEED" from the definition of "PIT" for the node "PEACH", or to add a "SEED" element to the node for "APPLE". (Refer to FIG. 3 to see the corresponding node structures.) The removal can be effected by editing file XS1 and deleting the syntax shown at 474; the addition can be effected by editing file XS2 and adding similar syntax. When the unstreaming process reads the files XS1 and XS2, as will be described in more detail below, any modifications are automatically integrated into the reconstituted DOM tree.

A preferred embodiment of the logic used to implement the selective streaming technique of the present invention will now be discussed with reference to FIGS. 5–9. FIG. 5 illustrates the highest-level processing flow, which begins at Block 500 by setting a node pointer "NP" to point to the root node of the input DOM tree. With reference to the input tree 300 of FIG. 3, this pointer would point to the node 310. Block 505 then checks to see if the node pointer has a null value. This check may have a positive result if, for example, the tree has been deleted or cannot otherwise be found. The selective streaming process will terminate in this situation. Otherwise, processing continues at Block 510, where an output stream BSR (Binary Stream containing Root) is opened for serialized binary object output. By convention, in the preferred embodiment the root node is always streamed into a serialized binary output stream. Block 520 then invokes the streamOut method (depicted in FIG. 6), passing as an input parameter the just-opened stream BSR. Control will return from the invocation in Block 520 when the input DOM tree has been completely (recursively) processed. Block 525 then closes the binary output stream BSR, after which the selective streaming process for the selected DOM tree is complete.

FIG. 6 depicts the logic used in the preferred embodiment to stream data out in serialized binary form. This process is initially invoked from Block 520 of FIG. 5, and then is subsequently invoked recursively from Block 615 and from Block 920 of FIG. 9 when changing from XML streaming to serialized binary streaming (as will be described below). Each invocation of this process requires an input parameter referred to in FIG. 6 as "BS", which is the name of the binary stream into which data is currently being streamed. The streamOut logic begins by checking the value of the special STREAM-AS-XML attribute in Block 605 for the current node "CN" (that is, the node for which this logic was invoked). If the attribute value is TRUE, processing continues at Block 620; otherwise, the value is FALSE, and processing continues at Block 610.

Upon reaching Block 610, it is known that the current node is to be streamed in binary mode. At Block 610, the elementary data (i.e. the data which does not represent a nested object such as a child node) for the current node is streamed to the serial binary output stream BS. Sufficient information will be streamed out to enable later recreation of the structure of the object in the DOM tree. The details of this information will depend upon the parser with which the DOM tree was originally created. In particular, one elementary data value to be streamed to the output stream is the attribute/value pair for STREAM-AS-XML (where the value will be FALSE, as shown in FIG. 4A at elements 411, 421, 451, 431). If this current node has any child nodes, Block 615 recursively invokes the streamOut method of FIG. 6 for each such child node in turn, passing the serialized binary stream identified by "BS" as the input parameter. Techniques for traversing a tree, and recursively locating and invoking operations upon the descendent nodes, are well known in the art. In addition, it will be obvious to one of skill in the art that elementary data for a node may be intermingled with child objects of the node. The intermingling information is already captured by the structure of the parsed DOM tree. Accordingly, the processes of Block 610 and 615, while shown as being sequential in FIG. 6, may actually occur in an intermingled fashion. (This intermingling possibility applies similarly to Blocks 710 and 715 of FIG. 7.).

Once a particular node and all its child nodes have been processed according to Blocks 610 and 615, control returns to the invoking logic.

Block 620 is reached when the test at Block 605 has a positive result (i.e. the node currently being processed is to be streamed in XML mode). Therefore, a transition is required, and the logic beginning at Block 800 of FIG. 8 is invoked to stream an XML subdocument. This invocation returns a file name which identifies the file into which the XML subdocument was written (see FIG. 8). Block 625 then streams this returned file name into the file identified by BS, as the STREAM-AS-XML attribute for the node for which the logic of FIG. 6 was invoked. This creates what is referred to herein as a "transition node". After streaming the transition node, control returns to the invoking logic.

FIG. 7 depicts the logic used in the preferred embodiment to stream data out as an XML subdocument using XML tags. This process is invoked from Block 820 of FIG. 8 when changing from serialized binary streaming to XML streaming, and is also invoked recursively from Block 715 of FIG. 7 (as will be described below). Each invocation of this process requires an input parameter referred to in FIG. 7 as "XS", which is the name of the XML stream into which data is currently being streamed. The XML streamOut logic begins by checking the value of the special STREAM-AS-XML attribute in Block 705 for the current node "CN" (as in FIG. 6, "CN" refers to the node for which this logic was invoked). If the attribute value is TRUE, processing continues at Block 710; otherwise, the value is FALSE, and processing continues at Block 720.

Upon reaching Block 710, it is known that the current node is to be streamed in XML mode. At Block 710, the elementary data for the current node, including the attribute/value pair for STREAM-AS-XML, is streamed to the XML output stream XS. If this current node has any child nodes, Block 715 recursively invokes the streamOut method of FIG. 7 for each such child node in turn, passing the XML stream identified by "XS" as the input parameter. Once a particular node and all its child nodes have been processed according to Block 710 and 715, control returns to the invoking logic.

Control reaches Block 720 when the test at Block 705 has a positive result (i.e. the node currently being processed is to be streamed in serialized binary mode). Therefore, a transition is required, and the logic beginning at Block 900 of FIG. 9 is invoked to stream a serialized binary subdocument. This invocation returns a file name which identifies the file into which the binary subdocument was written (see FIG. 9). Block 725 then streams this returned file name into the file identified by XS, creating a transition node which specifies the STREAM-AS-XML attribute for the node for which the logic of FIG. 7 was invoked. After streaming the transition node, control returns to the invoking logic.

The logic depicted in FIG. 8 switches the streaming from a serialized binary output file, to an XML output file (that is, a file containing XML syntax), according to the preferred embodiment of the present invention. This logic is invoked from Block 620 of FIG. 6, upon detecting the need for a change in streaming mode. In the preferred embodiment, a new XML output file is created upon each transition to XML mode. This is illustrated by FIG. 4A, where the output file XS1 (see element 462) was used upon the transition at node 460, and output file XS2 (see element 442) was used for the transition at node 440. Accordingly, Block 805 obtains a unique name for this output stream. Techniques for obtaining unique file names are commonly provided by operating systems or programming toolkits, such as the "UID" package provided with the Java Development Toolkit. Block 805 invokes the appropriate method for the environment in which the present invention is implemented. If no such file name generation to software is available, it will be obvious to one of skill in the art how to add this function to the logic of FIG. 8 (e.g. by invoking a random string generator, or sequentially concatenating symbols for each subsequent file name; and then verifying that no file already exists on the target storage medium with the created name). After obtaining this unique name, the letter "X" is preferably prepended to the name, providing an intuitive indicator that this is a file containing XML output data. Block 810 opens a new XML output stream, denoted in FIG. 8 as "XS", using this new file name.

At Block 820, the current node is streamed as XML tags, including its attributes and any immediate tag values, by invoking the streamOut method beginning at Block 700 of FIG. 7. The output stream XS is passed as an input parameter of this invocation. When the processing of Block 820 completes, Block 825 closes the current XML output stream. (If a return to streaming in serialized binary mode occurs, a new binary output file will be created for that subsequent output, by invoking of the logic of FIG. 9.) Control then returns to the invoking logic, returning the name of the file created by Block 805 as an output parameter.

FIG. 9 depicts the logic used in the preferred embodiment to implement a transition from streaming to an XML file to streaming to a serial binary file. (This processing is invoked from Block 720 of FIG. 7, upon detecting the need to change from XML mode to binary mode.) The process begins at Block 905, where a unique name for a new binary file is obtained (using a similar technique as previously described with reference to Block 805 of FIG. 8). After obtaining this unique name, the letter "B" is preferably prepended to the name, providing an intuitive indicator that this is a file storing a binary stream. Block 910 opens a new binary output stream, denoted in FIG. 9 as "BS", using this new file name.

At Block 920, the current node is streamed as serialized binary data by invoking the streamOut method beginning at Block 600 of FIG. 6. The output stream BS is passed as an input parameter of this invocation. When the processing of Block 920 completes, Block 925 closes the current serialized binary output stream. (If a return to streaming in XML mode occurs, a new XML output file will be created for that subsequent output, by invoking of the logic of FIG. 8.) Control then returns to the invoking logic, returning the name of the file created by Block 905 as an output parameter.

Figure 10:
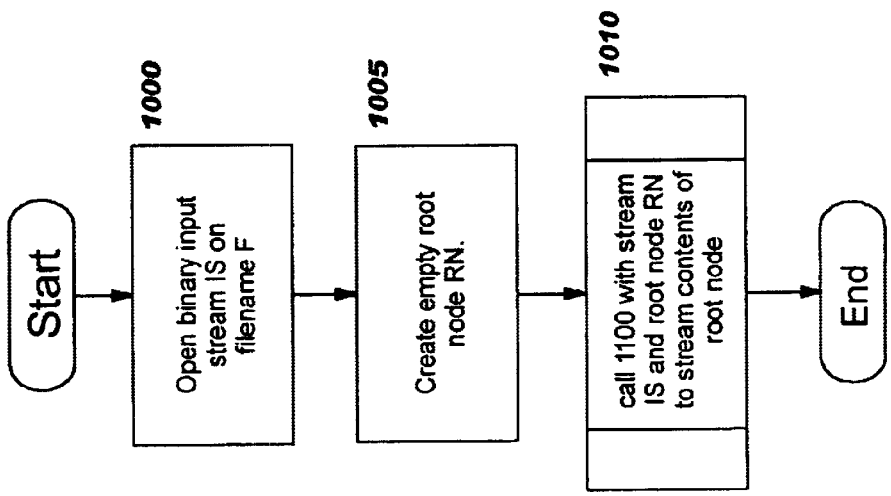
FIGS. 10–12 illustrate flow charts which set forth the logic which may be used to implement a preferred embodiment of reversing the selective streaming technique of the present invention, to reconstitute the DOM tree.
Figure 11:
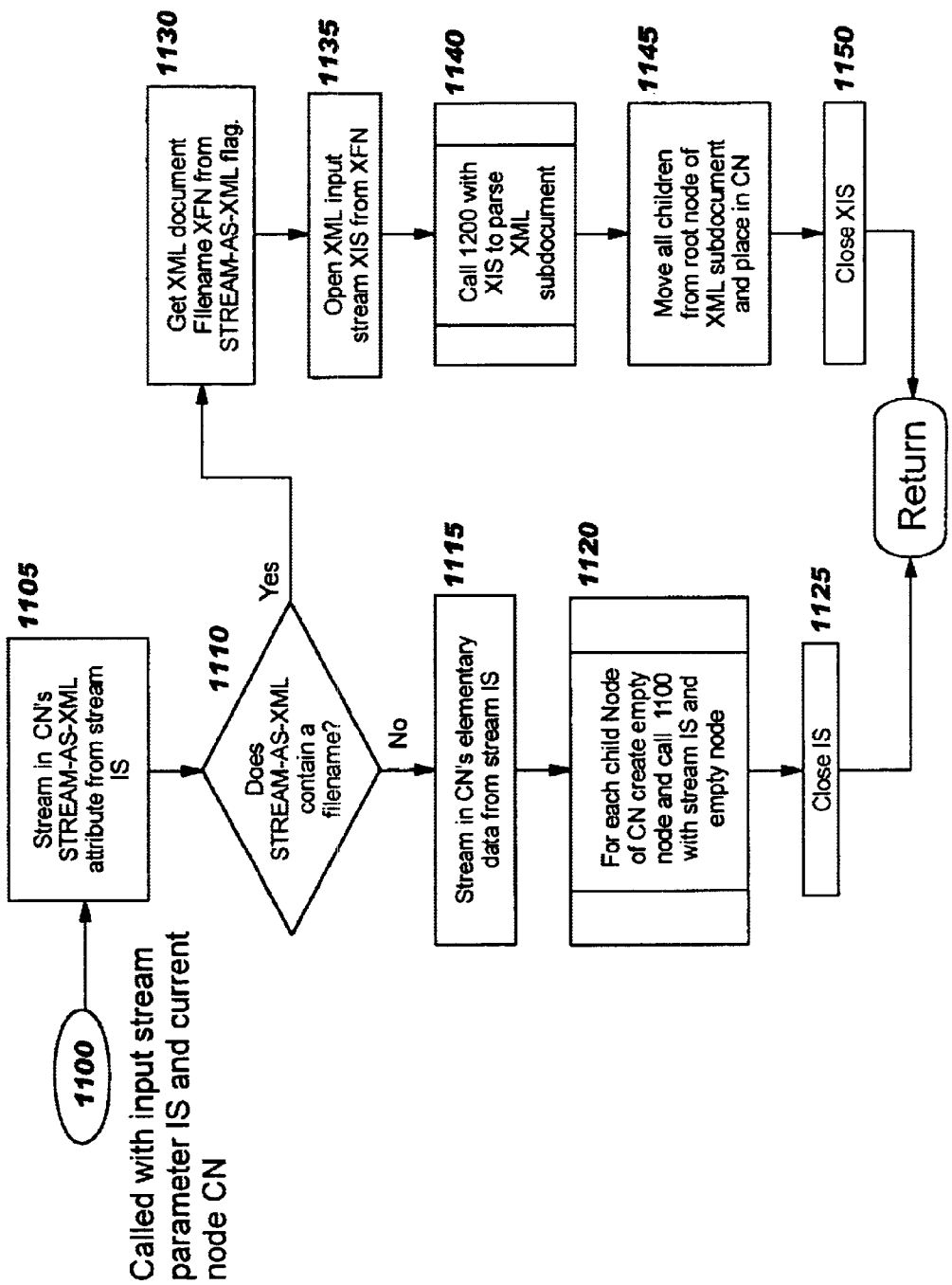
Figure 12:
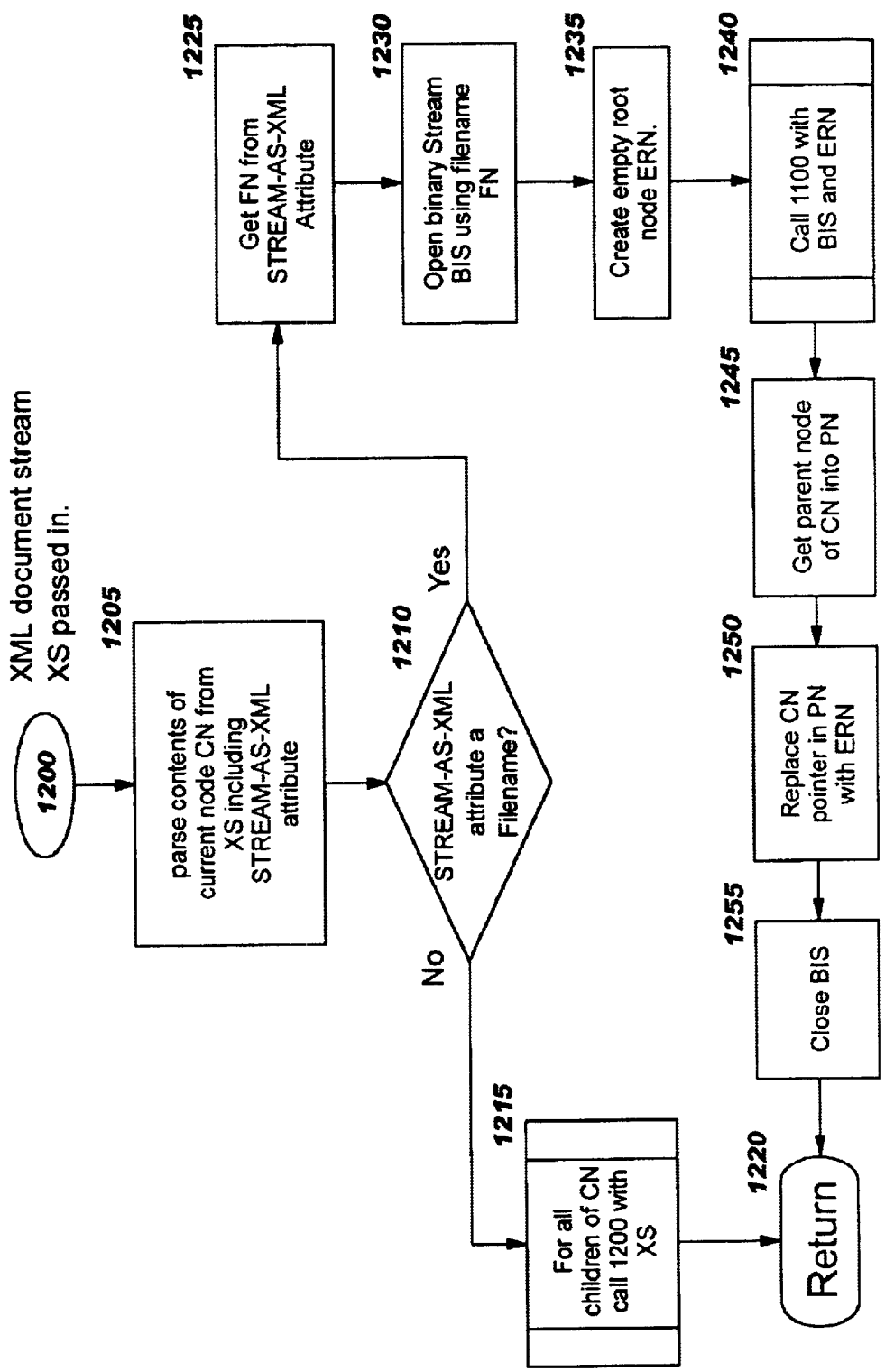

FIGS. 10–12 illustrate flow charts which set forth the logic which may be used to implement a preferred embodiment of unstreaming, or reversing the selective streaming technique of the present invention. In this manner, the DOM tree for the original XML document is efficiently reconstituted, automatically reflecting any changes that may have been made to the XML data stored in the XML stream files. (While this discussion refers to streaming in data from "a file", this is for purposes of illustration and not of limitation. The data being read in may come from a collection of files, including an archived collection which may have been compressed using a utility such as PKZIP; it may come from a transmission over a communications channel; etc.)

FIG. 10 begins at Block 1000 by opening the binary input stream "IS" on a particular file name "F" where the binary stream has been previously stored. Block 1005 creates an empty root node, referred to herein as "RN". Block 1010 then invokes the process depicted in FIG. 11 to stream data in from a serialized binary stream, passing as an input parameter the just-opened stream IS and the root node RN. Control will return from the invocation in Block 1010 when the input stream has been completely (recursively) processed, after which the unstreaming process for the selected input file is complete.

FIG. 11 represents the streaming in of data from a binary stream, and is invoked initially from Block 1010 of FIG. 10, and then recursively as will be discussed. As shown in FIG. 11, two input parameters are passed to this method, the first of which identifies the stream from which data is currently being read, and the second identifying the current node "CN". On the first invocation, the stream is the binary stream and the first information to be read pertains to the root node of the DOM tree. Subsequent invocations will refer either to this binary stream, or to a different binary stream that was opened following detection of a transition from XML to binary (as described below with reference to Block 1230 of FIG. 12.) Block 1105 streams in the current node's STREAM-AS-XML attribute, from the current binary stream. At Block 1110, a check is made to determine whether the STREAM-AS-XML attribute for the current node is set to a file name. If not, then control transfers to Block 1115. Otherwise, when the attribute does contain a file name, control transfers to Block 1130.

Control reaches Block 1115 when the STREAM-AS-XML attribute was not a file name. By definition, the attribute must have been set to "FALSE", indicating that the data was streamed in binary mode at this point in the original DOM tree. Block 1115 then streams in (or "unstreams") the elementary binary data for the current node from the stream IS. For any children of the current node, Block 1120 creates an empty root node and then recursively invokes the logic of FIG. 11 to process the child node. The current binary stream IS and the just-created empty node are passed as input parameters on this invocation. Upon completing the processing of Block 1120, the input stream IS is closed at Block 1125, and control returns to the invoking logic.

Control reaches Block 1130 when the value of the STREAM-AS-XML attribute was detected in Block 1110 as being a file name. This indicates that streaming changed to XML mode at this point during the previous streaming-out process on the original DOM tree. At Block 1130, the file name from the attribute value (containing the name of an XML file) is stored into XFN, and an XML input stream "XIS" in opened on this file XFN in Block 1135. Block 1140 then invokes the logic of FIG. 12 (which begins at 1200) to parse the XML subdocument stored in this file, passing as a parameter the just-opened XML document stream XFN. Upon returning from this invocation, the subtree which has been created by the parsing process is copied at Block 1145 into the location held by the current node. Block 1150 then closes the input stream XIS, and control returns to the invoking logic.

FIG. 12 depicts the logic used in the preferred embodiment to stream input in from an XML file by parsing an XML subdocument. Control reaches this logic 1200 from Block 1140 of FIG. 11 upon detecting a transition node, and recursively from Block 1215 of the logic of FIG. 12. Block 1205 streams in (i.e. by parsing) the contents of the current node CN from the input stream XS, including the node's STREAM-AS-XML attribute. An XML parser produces a (sub)tree of nodes, as represented by the XML syntax. Upon completing the processing of FIG. 12, a subtree has been created, which will then be copied into the DOM tree at the appropriate location by the invoking logic. (See the description of Block 1145 of FIG. 11, above.)

Block 1210 then checks to see if the STREAM-AS-XML attribute for this node is set to a file name. If not, then it was set to TRUE, and control transfers to Block 1215. Block 1215 recursively invokes the processing of FIG. 12 for any children of the current node, such that each child will be added to the subtree being created. When all children of this node have been processed at Block 1215, control returns from the current invocation.

When Block 1210 has a positive result, i.e. the attribute contains a file name, this indicates that a transition node has been encountered, which indicates that a change to binary streaming mode occurred at this point when the DOM tree being reconstituted was previously streamed out. In this case, control reaches Block 1225, which gets the file name FN stored as the value of the attribute. Block 1230 opens a binary stream, BIS, on this file name FN. Block 1235 then creates an empty root node, ERN, to use in streaming in the binary subdocument stored in this file. Block 1240 then invokes the logic of FIG. 11 (at 1100), to stream in data from the just-opened binary stream, passing as input parameters this just-opened stream and the empty root node ERN. Upon returning from this invocation, Block 1245 gets the parent node of the current node CN into the variable PN. Block 1250 replaces PN's pointer to CN (which was a transition node) with the subtree that has been created from the node ERN. Block 1255 then closes the input stream BIS, and control returns to the logic from which this processing was invoked.

Note that while the logic of the flowcharts in FIGS. 10–12 indicates that the entire DOM tree is reconstituted at one time, it may be preferable to selectively reconstitute the DOM tree, for example as a user traverses to a particular subtree. It will be obvious to one of skill in the art how this can be facilitated by modifying the logic depicted. This alternative approach is considered to be within the scope of the present invention.

The preferred embodiment allows transitions between TRUE and FALSE for the STREAM-AS-XML attribute to occur at any point in a subtree, and as many times as desired, in order to provide maximum flexibility in treating data as static or dynamic. In an alternative embodiment, a trade-off may be made between this flexibility and a reduction in the number of files/streams being generated. In this alternative embodiment, once a transition to STREAM-AS-XML= TRUE has occurred within a particular subtree, the entire subtree must use this same streaming mode. Thus, the entire subtree from that point is treated as dynamic data, and is streamed in XML syntax into the same file. It will be obvious to one of skill in the art that the flowcharts which have been provided will serve to implement this alternative embodiment. Alternatively, one skilled in the art may prefer to simplify the flowcharts so that once a transition to XML occurs within a subtree, no further transitions are possible (e.g. by removing Blocks 705, 720, and 725 of FIG. 7 and the processing of FIG. 9). A single binary output stream will be created when using this alternative embodiment, as was previously discussed.

While the preferred embodiment of the present invention has been described, additional variations and modifications in that embodiment may occur to those skilled in the art once they learn of the basic inventive concepts. The techniques disclosed herein are based partially upon certain predefined characteristics of the XML notation. It will be obvious to one of ordinary skill in the art that the inventive concepts disclosed herein may be adapted to changes in the notation, should they occur. The inventive concepts may also be used with notations other than XML that provide the same characteristics described herein for XML documents, and with modeling techniques other than DOM trees that exhibit the required properties discussed for DOM trees (i.e. the modelling technique creates a tree that represents the structure and content described in the particular notation.) Therefore, it is intended that the appended claims shall be construed to include both the preferred embodiment and all such variations and modifications as fall within the spirit and scope of the invention.

We claim:

1. In a computing environment, a computer program product on a computer-readable medium readable by a computer system in said environment, for selectively streaming documents, comprising:
   an input Document Object Model (DOM) tree representing a document to be selectively streamed;
   computer-readable program code means for processing each of a plurality of nodes of said DOM tree, wherein each of said nodes has either a static indicator or a dynamic indicator associated therewith;
   computer-readable program code means for streaming each of said processed nodes which has said static indicator to a serialized binary output stream; and
   computer-readable program code means for streaming each of said processed nodes which has said dynamic indicator to one or more non-binary output files.

2. Computer readable code for selectively streaming documents according to claim 1, further comprising:
   computer-readable program code means for processing a transition from binary mode to tag mode upon detecting a change from processing nodes having said static indicator to processing nodes having said dynamic indicator, further comprising:
     computer-readable program code means for writing a transition node indicator into said serialized binary output stream;
     computer-readable program code means for opening a new one of said non-binary output files; and
     computer-readable program code means for writing to said opened new non-binary output file until detecting a subsequent mode change; and
   computer-readable program code means for processing a transition from tag mode to binary mode upon detecting said subsequent mode change wherein said processed nodes had said dynamic indicator but now have said static indicator, further comprising
     computer-readable program code means for writing a transition node indicator into said opened new non-binary output file; and
     computer-readable program code means for writing to said serialized binary output stream until detecting said change.

3. Computer readable code for selectively streaming documents according to claim 1, wherein said computer-readable program code means for streaming each of said processed nodes which has said static indicator streams said processed nodes to one or more serialized binary output streams, and further comprising:
   computer-readable program code means for processing a transition from binary mode to tag mode upon detecting a change from processing nodes having said static indicator to processing nodes having said dynamic indicator, further comprising:
     computer-readable program code means for writing a transition node indicator into said serialized binary output stream;
     computer-readable program code means for opening a new one of said non-binary output files; and
     computer-readable program code means for writing to said opened new non-binary output file until detecting a subsequent mode change; and
   computer-readable program code means for processing a transition from tag mode to binary mode upon detecting said subsequent mode change wherein said processed nodes had said dynamic indicator but now have said static indicator, further comprising:
     computer-readable program code means for writing a transition node indicator into said opened new non-binary output file;
     computer-readable program code means for opening a new one of said serialized binary output streams; and
     computer-readable program code means for writing to said opened new serialized binary output stream until detecting said change.

4. Computer readable code for selectively streaming documents according to claim 3, further comprising computer-readable Program code means for reconstituting said DOM tree or a modified version thereof from said one or more serialized binary output streams and said one or more non-binary output files.

5. Computer readable code for selectively streaming documents according to claim 1, wherein said non-binary output files comprise information encoded in a tag language.

6. Computer readable code for selectively streaming documents according to claim 5, wherein said tag language is Extensible Markup Language (XML).

7. Computer readable code for selectively streaming documents according to claim 5, wherein said tag language is a derivative of Extensible Markup Language (XML).

8. Computer readable code for selectively streaming documents according to claim 1, further comprising computer-readable program code means for reconstituting said DOM tree or a modified version thereof from said serialized binary output stream and said one or more non-binary output files.

9. A system for selectively streaming documents in a computing environment, comprising:

an input Document Object Model (DOM) tree representing a document to be selectively streamed;

means for processing each of a plurality of nodes of said DOM tree, wherein each of said nodes has either a static indicator or a dynamic indicator associated therewith;

means for streaming each of said processed nodes which has said static indicator to a serialized binary output stream; and means for streaming each of said processed nodes which has said dynamic indicator to one or more non-binary output files.

10. The system for selectively streaming documents according to claim 9, further comprising:

means for processing a transition from binary mode to tag mode upon detecting a change from processing nodes having said static indicator to processing nodes having said dynamic indicator, further comprising:

means for writing a transition node indicator into said serialized binary output stream;

means for opening a new one of said non-binary output files; and means for writing to said opened new non-binary output file until detecting a subsequent mode change; and means for processing a transition from tag mode to binary mode upon detecting said subsequent mode change wherein said processed nodes had said dynamic indicator but now have said static indicator, further comprising:

means for writing a transition node indicator into said opened new non-binary output file; and means for writing to said serialized binary output stream until detecting said change.

11. The system for selectively streaming documents according to claim 9, wherein said means for streaming each of said processed nodes which has said static indicator streams said processed nodes to one or more serialized binary output streams, and further comprising:

means for processing a transition from binary mode to tag mode upon detecting a change from processing nodes having said static indicator to processing nodes having said dynamic indicator, further comprising:

means for writing a transition node indicator into said serialized binary output stream;

means for opening a new one of said non-binary output files; and means for writing to said opened new non-binary output file until detecting a subsequent mode change; and means for processing a transition from tag mode to binary mode upon detecting said subsequent mode change wherein said processed nodes had said dynamic indicator but now have said static indicator, further comprising:

means for writing a transition node indicator into said opened new non-binary output file;

means for opening a new one of said serialized binary output streams; and means for writing to said opened new serialized binary output stream until detecting said change.

12. The system for selectively streaming documents according to claim 11, further comprising means for reconstituting said DOM tree or a modified version thereof from said one or more serialized binary output streams and said one or more non-binary output files.

13. The system for selectively streaming documents according to claim 9, wherein said non-binary output files comprise information encoded in a tag language.

14. The system for selectively streaming documents according to claim 13, wherein said tag language is Extensible Markup Language (XML).

15. The system for selectively streaming documents according to claim 13, wherein said tag language is a derivative of Extensible Markup Language (XML).

16. The system for selectively streaming documents according to claim 9, further comprising means for reconstituting said DOM tree or a modified version thereof from said serialized binary output stream and said one or more non-binary output files.

17. A method for selectively streaming documents in a computing environment, comprising the steps of:

processing each of a plurality of nodes of an input Document Object Model (DOM) tree representing a document to be selectively streamed, wherein each of said nodes has either a static indicator or a dynamic indicator associated therewith;

streaming each of said processed nodes which has said static indicator to a serialized binary output stream; and streaming each of said processed nodes which has said dynamic indicator to one or more non-binary output files.

18. The method for selectively streaming documents according to claim 17, further comprising the steps of:

processing a transition from binary mode to tag mode upon detecting a change from processing nodes having said static indicator to processing nodes having said dynamic indicator, further comprising the steps of:

writing a transition node indicator into said serialized binary output stream;

opening a new one of said non-binary output files; and writing to said opened new non-binary output file until detecting a subsequent mode change; and processing a transition from tag mode to binary mode upon detecting said subsequent mode change wherein said processed nodes had said dynamic indicator but now have said static indicator, flirter comprising the steps of:

writing a transition node indicator into said opened new non-binary output file; and writing to said serialized binary output stream until detecting said change.

19. The method for selectively streaming documents according to claim 17, wherein said step of streaming each of said processed nodes which has said static indicator streams said processed nodes to one or more serialized binary output streams, and further comprising the steps of:

processing a transition from binary mode to tag mode upon detecting a change from processing nodes having said static indicator to processing nodes having said dynamic indicator, further comprising the steps of:

writing a transition node indicator into said serialized binary output stream;

opening a new one of said non-binary output files; and writing to said opened new non-binary output file until detecting a subsequent mode change; and processing a transition from tag mode to binary mode upon detecting said subsequent mode change wherein said processed nodes had said dynamic indicator but now have said static indicator, further comprising the steps of:

writing a transition node indicator into said opened new non-binary output file;

opening a new one of said serialized binary output streams; and writing to said opened new serialized binary output stream until detecting said change.

20. The method for selectively streaming documents according to claim 19, further comprising the step of reconstituting said DOM tree or a modified version thereof from said one or more serialized binary output streams and said one or more non-binary output files.

21. The method for selectively streaming documents according to claim 17, wherein said non-binary output files comprise information encoded in a tag language.

22. The method for selectively streaming documents according to claim 21, wherein said tag language is Extensible Markup Language (XML).

23. The method for selectively streaming documents according to claim 21, wherein said tag language is a derivative of Extensible Markup Language (XML).

24. The method for selectively streaming documents according to claim 17, further comprising the step of reconstituting said DOM tree or a modified version thereof from said serialized binary output stream and said one or more non-binary output files.

* * * * *